US007050942B2

(12) United States Patent
Hirayama et al.

(10) Patent No.: US 7,050,942 B2
(45) Date of Patent: May 23, 2006

(54) OBJECT STATE CLASSIFICATION METHOD AND SYSTEM, AND PROGRAM THEREFOR

(75) Inventors: Masayuki Hirayama, Yokohama (JP); Katsuhiko Ueki, Tokyo (JP); Wataru Okamoto, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 348 days.

(21) Appl. No.: 10/736,705

(22) Filed: Dec. 17, 2003

(65) Prior Publication Data

US 2004/0128104 A1    Jul. 1, 2004

(30) Foreign Application Priority Data

Dec. 26, 2002    (JP)    ............................. 2002-378218

(51) Int. Cl.
*G06F 19/00*    (2006.01)
(52) U.S. Cl. ........................ 702/186; 717/124; 717/108
(58) Field of Classification Search .................... None
See application file for complete search history.

(56) References Cited

U.S. PATENT DOCUMENTS

| | | | |
|---|---|---|---|
| 5,794,043 A * | 8/1998 | Kolb | 717/124 |
| 5,974,255 A * | 10/1999 | Gossain et al. | 717/124 |
| 6,031,990 A * | 2/2000 | Sivakumar et al. | 717/124 |
| 6,219,829 B1 * | 4/2001 | Sivakumar et al. | 717/131 |
| 6,523,169 B1 * | 2/2003 | Glunz | 717/124 |
| 6,601,019 B1 * | 7/2003 | Liles et al. | 702/186 |
| 6,694,507 B1 * | 2/2004 | Arnold et al. | 717/108 |
| 6,826,746 B1 * | 11/2004 | Evans et al. | 717/124 |
| 6,959,432 B1 * | 10/2005 | Crocker | 717/126 |

(Continued)

FOREIGN PATENT DOCUMENTS

JP    7-262044    10/1995

OTHER PUBLICATIONS

Hyoung Seok Hong, et al., "Testing of Object-Oriented Programs Based on Finite State Machines", Proceedings of Asia-Pacific Software Engineering Conference '95, Dec. 1995, pp. 234-241 (Translated pp. 1-14).

(Continued)

*Primary Examiner*—Patrick J. Assouad
(74) *Attorney, Agent, or Firm*—Oblon, Spivak, McClelland, Maier & Neustadt, P.C.

(57) ABSTRACT

An object state classification method includes a step of designating a to-be-determined object that is to be determined, and a state of the to-be-determined object, a step of creating a method set including, as elements, methods called from the designated state of the to-be-determined object, a step of using, as a to-be-determined state, the designated state of the to-be-determined object or another state obtained by calling methods from the designated state, and executing a program for calling methods included in the method set from the to-be-determined state, a step of recording an execution result in a case of calling the methods, and a step of creating a pseudo-state by merging a method group that is the elements of the method set, and the execution result in the case of calling each method of the method group, in association with the to-be-determined state of the to-be-determined object.

12 Claims, 10 Drawing Sheets

U.S. PATENT DOCUMENTS

| | | | |
|---|---|---|---|
| 2002/0091995 A1* | 7/2002 | Arnold et al. | 717/124 |
| 2002/0162091 A1* | 10/2002 | Crocker | 717/126 |
| 2003/0097650 A1* | 5/2003 | Bahrs et al. | 717/124 |
| 2003/0196189 A1* | 10/2003 | Wang et al. | 717/124 |
| 2004/0128104 A1* | 7/2004 | Hirayama et al. | 702/150 |
| 2005/0010899 A1* | 1/2005 | Kung et al. | 717/108 |
| 2005/0132333 A1* | 6/2005 | Neumann et al. | 717/124 |
| 2005/0144593 A1* | 6/2005 | Raghuvir et al. | 717/124 |
| 2005/0268285 A1* | 12/2005 | Bagley et al. | 717/124 |

OTHER PUBLICATIONS

U.S. Appl. No. 09/867,630, filed May 31, 2001, Ueki et al.
U.S. Appl. No. 10/329,397, filed Dec. 27, 2002, Ueki et al.
Hyoung Seok Hong et al., "Testing of Object-Oriented Programs Based on Finite State Machines", Proceedings of Asia-Pacific Software Engineering Conference '95, Dec. 1995, pp. 234-241(Translated pp. 1-14).

* cited by examiner

FIG. 3

```
//
class Door
{ protected:

int     angle;
    bool    flgLock;

public:
    void    setAngle(int a);
    void    lock();
    void    unLock();
    bool    isOpened();
};
void Door::setAngle(int a)
{
    if(flgfLock) {
        return;              //BLOCK 11
    }
    if (a < 0) {
        angle = 0;           //BLOCK 12
    } else if (a <= 90) {
        angle = a;           //BLOCK 13
    } else {
        angle = 90;          //BLOCK 14
    }
}
void Door::lock()
{
    if (angle) {
        angle = 0;           //BLOCK 21
    }
    flgLock = true;          //BLOCK 22
} void Door::unLock()
{
    flgLock = false;         //BLOCK 31
} bool Door::isOpened()
{
    if (angle == 0) {
        return false;        //BLOCK 41
    } else {
        return true;         //BLOCK 42
    }
}
//
```

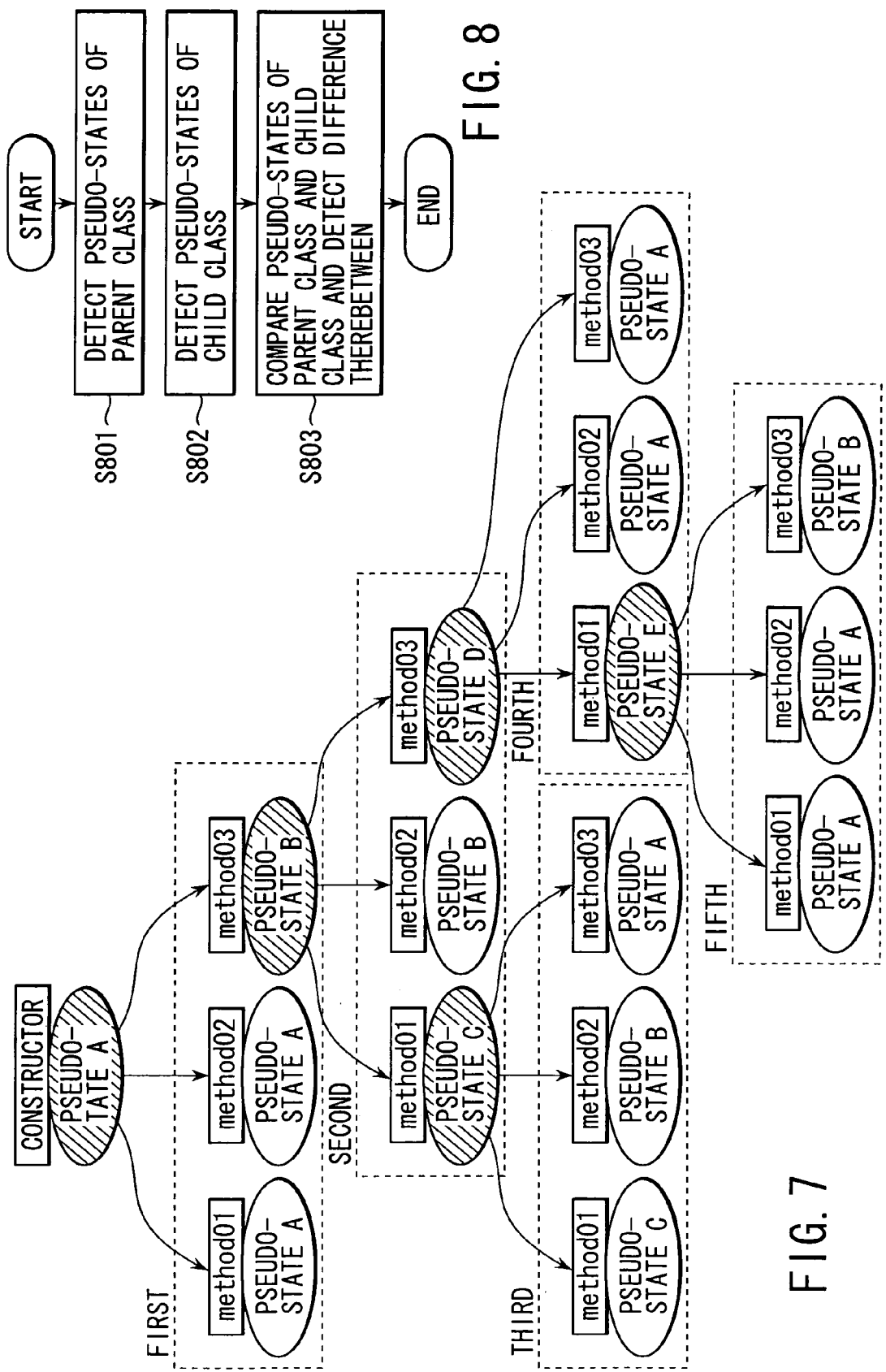

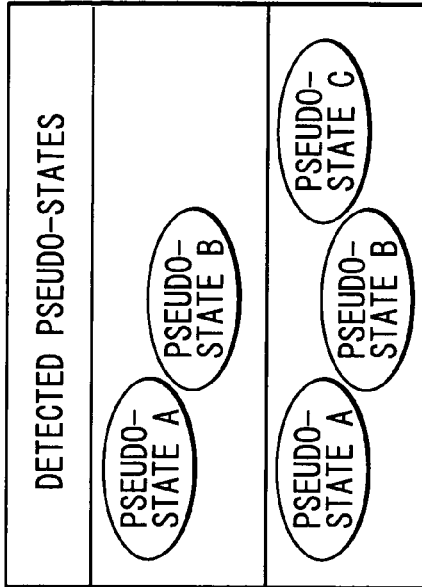

```
class Parent
{
    int p1;
    int p2;
    void PMethod01();
    void PMethod02();
    void PMethod03();
};
class Child:public Parent
{
    void CMethod01();
    void CMethod02();
};
```

| INSTANCE | INITIAL STATE | STATE SEARCH METHOD SET | STATE JUDGE METHOD SET | DETECTED PSEUDO-STATES |
|---|---|---|---|---|
| Parent | p1=0, p2=0 | { PMethod01(), PMethod02(), PMethod03() } | { PMethod01(), PMethod02(), PMethod03() } | PSEUDO-STATE A, PSEUDO-STATE B |
| Child | p1=0, p2=0 | { CMethod01(), CMethod02() } | | PSEUDO-STATE A, PSEUDO-STATE B, PSEUDO-STATE C |

EXAMPLE OF CONCRETE STATE
{
　angle = 30,
　flgLock = true
}

FIG. 11

EXAMPLE OF STATE JUDGE METHOD SET
{
　{METHOD:setAngle, ARGUMENT:a=10} ,
　{METHOD:setAngle, ARGUMENT:a=45} ,
　{METHOD:lock, ARGUMENT (NONE), METHOD:isOpened, ARGUMENT (NONE) } ,
　{METHOD:isOpened, ARGUMENT (NONE) }
}

FIG. 12

EXAMPLE OF PSEUDO-STATE
{
　{METHOD:setAngle, ARGUMENT:a=10} , EXECUTION RESULT:Path01} ,
　{METHOD:setAngle, ARGUMENT:a=45} , EXECUTION RESULT:Path02} ,
　{METHOD:lock, ARGUMENT (NONE), METHOD:isOpened, ARGUMENT (NONE) } , EXECUTION RESULT:Path03}
　{METHOD:isOpened, ARGUMENT (NONE) } , EXECUTION RESULT:Path04}
}

FIG. 13

| STATE 01 | Angle = 0  | flgLock = false |
|----------|------------|-----------------|
| STATE 02 | Angle = 0  | flgLock = true  |
| STATE 03 | Angle = 45 | flgLock = false |
| STATE 04 | Angle = 45 | flgLock = true  |
| STATE 05 | Angle = 60 | flgLock = false |
| STATE 06 | Angle = 60 | flgLock = true  |
| STATE 07 | Angle = 90 | flgLock = false |
| STATE 08 | Angle = 90 | flgLock = true  |

FIG. 14
```
STATE JUDGE METHOD SET   JudgeSet1 {
    {METHOD:  Door::isOpened,  ARGUMENT:(NONE)} ,
    {METHOD:  Door::unLock,    ARGUMENT:(NONE)} ,
    {METHOD:  Door::lock,      ARGUMENT:(NONE)} ,
    {METHOD:  Door::setAngle,  ARGUMENT:a=-10} ,
    {METHOD:  Door::setAngle,  ARGUMENT:a=45} ,
    {METHOD:  Door::setAngle,  ARGUMENT:a=100}
```

FIG. 17

| NAME OF PSEUDO-STATE | STATE         |
|----------------------|---------------|
| PSEUDO-STATE A       | STATE 01      |
| PSEUDO-STATE B       | STATE 02      |
| PSEUDO-STATE C       | STATE 03, 05, 07 |
| PSEUDO-STATE D       | STATE 04, 06, 08 |

FIG. 18
```
1. INITIAL STATE α →method01()→judge01()
2. INITIAL STATE α →method01()→judge02()
3. INITIAL STATE α →method01()→judge03()
4. INITIAL STATE α →method02()→judge01()
5. INITIAL STATE α →method02()→judge02()
6. INITIAL STATE α →method02()→judge03()
7. INITIAL STATE α →method03()→judge01()
8. INITIAL STATE α →method03()→judge02()
9. INITIAL STATE α →method03()→judge03()
```

FIG. 15

```
PSEUDO-STATE ASSOCIATED WITH STATE 01
 { { METHOD: Door::isOpened, ARGUMENT: (NONE) }, EXECUTION PATH:BLOCK 41 },
 { { METHOD: Door::unLock,   ARGUMENT: (NONE) }, EXECUTION PATH:BLOCK 31 },
 { { METHOD: Door::Lock,     ARGUMENT: (NONE) }, EXECUTION PATH:BLOCK 22 },
 { { METHOD: Door::setAngle, ARGUMENT: a=-10  }, EXECUTION PATH:BLOCK 12 },
 { { METHOD: Door::setAngle, ARGUMENT: a= 45  }, EXECUTION PATH:BLOCK 13 },
 { { METHOD: Door::setAngle, ARGUMENT: a=100  }, EXECUTION PATH:BLOCK 14 },
```

FIG. 16

| NAME OF STATE | isOpened ARGUMENT :(NONE) | unLock ARGUMENT :(NONE) | lock ARGUMENT :(NONE) | setAngle ARGUMENT :-10 | setAngle ARGUMENT :45 | setAngle ARGUMENT :100 | NAME OF PSEUDO-STATE |
|---|---|---|---|---|---|---|---|
| STATE 01 | 41 | 31 | 22 | 12 | 13 | 14 | PSEUDO-STATE A |
| STATE 02 | 41 | 31 | 22 | 11 | 11 | 11 | PSEUDO-STATE B |
| STATE 03 | 42 | 31 | 21-22 | 12 | 13 | 14 | PSEUDO-STATE C |
| STATE 04 | 42 | 31 | 21-22 | 11 | 11 | 11 | PSEUDO-STATE D |
| STATE 05 | 42 | 31 | 21-22 | 12 | 13 | 14 | PSEUDO-STATE C |
| STATE 06 | 42 | 31 | 21-22 | 11 | 11 | 11 | PSEUDO-STATE D |
| STATE 07 | 42 | 31 | 21-22 | 12 | 13 | 14 | PSEUDO-STATE C |
| STATE 08 | 42 | 31 | 21-22 | 11 | 11 | 11 | PSEUDO-STATE D |

FIG. 19A (PRIOR ART)

```
class DUMMY
{
    int a;
    int b;
    void methodA();
    void methodB();
};
```

FIG. 19B (PRIOR ART)

TESTS IN CASE WHERE DESIGNER'S INTENDED STATE IS NOT DEFINED
CONCRETE STATE IS SET AND VARIOUS METHODS ARE CALLED FROM THE STATE

CONCRETE STATE 1
a = 10;
b = 20;

CONCRETE STATE 2
a = 20;
b = 30;

TEST CASE 1: CALL METHOD A FROM CONCRETE STATE 1
TEST CASE 2: CALL METHOD B FROM CONCRETE STATE 1
TEST CASE 3: CALL METHOD A FROM CONCRETE STATE 2
TEST CASE 4: CALL METHOD B FROM CONCRETE STATE 2

FIG. 19C (PRIOR ART)

TESTS IN CASE WHERE DESIGNER'S INTENDED STATE IS DEFINED

CONCRETE STATE 1
a = 10;
b = 20;

CONCRETE STATE 2
a = 20;
b = 30;

DESIGNER'S INTENDED STATE
$0 < a < 100$
$0 < b < 50$

TO ENHANCE EFFICIENCY OF TESTS, IT IS SUFFICIENT, AS FIRST STEP, TO CONDUCT TESTS BASED ON CONCRETE STATE 1, WHICH IS CONCRETE EXAMPLE OF "DESIGNER'S INTENDED STATE"
   TEST CASE 1: CALL METHOD A FROM CONCRETE STATE 1
   TEST CASE 2: CALL METHOD B FROM CONCRETE STATE 1

OBJECT STATE CLASSIFICATION METHOD AND SYSTEM, AND PROGRAM THEREFOR

CROSS-REFERENCE TO RELATED APPLICATIONS

This application is based upon and claims the benefit of priority from the prior Japanese Patent Application No. 2002-378218, filed Dec. 26, 2002, the entire contents of which are incorporated herein by reference.

BACKGROUND OF THE INVENTION

1. Field of the Invention

The present invention relates to an object state classification method and system that are used to define pseudo-states in order to enhance the efficiency of tests in an object-oriented program.

2. Description of the Related Art

In predominant techniques of a unit test for a class in an object-oriented program, a variety of methods are called in association with an object that takes various states.

These techniques are disclosed in, for instance, Jpn. Pat. Appln. KOKAI Publication No. 9-325952; Jpn. Pat. Appln. KOKAI Publication No. 7-262044; Hyoung Seok Hong, Young Rae Kwon, and Sung Deok Cha, "Testing Object-Oriented Based on Finite State Machine", Asia-Pacific Software Engineering Conference, December 1995, p. 234; and D. C. Kung, N. Suchak, J. Gao, and P. Hsia, "On Object State Testing", COMPSAC: Computer Software and Applications Conference 1994, IEEE Computer Society Press, 1994, p. 222.

In these techniques, a program designer determines which states are present in a class. However, in most cases, it is not clearly defined which states are present in individual classes.

In a possible method for efficiently testing a class, a concrete state is created from abstract states (e.g. where states are defined by ranges of member variables), and this concrete state is used for the test. However, this method is feasible only after the state is defined. Conversely, if the state of the class is not clearly defined, the efficiency of the test cannot be achieved based on "state of class".

As stated above, unless the state of each class is defined, a general technique to be used for the test is as follows. As many as possible concrete states (obtained by setting values in individual member variables; hereafter referred to as "concrete state") are created as testers for tests of classes, and the concrete states are used to perform tests. It is likely that a plurality of concrete states, which are considered to belong to the same semantic group, are present in these many created concrete states. It is thus possible to consider that the "state" intended by the designer is a set of semantically equal concrete states.

However, the efficiency of testing deteriorates if a test is conducted for each of the semantically equal concrete states. This is explained in brief referring to FIG. 19A to FIG. 19C. FIG. 19A is a view illustrating an example of a list containing one class, the presence/absence of the definition of the designer's intended state associated with the class, and test cases associated with the presence/absence of the definition. In the case where the designer's intended state is defined, as shown in FIG. 19C, methods are called on the basis of only "concrete state 1" corresponding to the "designer's intended state", and the number of test cases is only two. On the other hand, in the case where the designer's intended state is not defined, as shown in FIG. 19B, methods are called based on all assumed concrete cases, that is, "concrete state 1" and "concrete state 2", and the number of test cases is four, which is double the number in the case where the designer's intended state is defined.

The reason for this problem is that the state of the class, unless defined by the program designer, cannot be determined from the outside.

BRIEF SUMMARY OF THE INVENTION

The present invention has been proposed to solve the above-described problems in the prior art, and provides an object state classification method and system, wherein even where a state of a class is not clearly defined, the state can be defined in a pseudo-fashion on the basis of operations of a program under various conditions, whereby the efficiency of tests can be enhanced on the basis of a unique measure of "comprehensive covering of states" with respect to any class, irrespective of the clear definition of the state of the class.

In the present invention, a pseudo-state is obtained in association with a concrete state of an object given by a user, by calling each of methods included in a method set given by the user. Thereby, states can be defined in a pseudo-fashion on the basis of operations of a program under various conditions. According this invention, concrete states of an object, which are to be tested and are present prior to calling methods, are restricted according to their associated pseudo-states, whereby the number of test cases is reduced and the efficiency of tests is enhanced.

An invention of claim 1 is a method of classifying states of an object in an object-oriented program by using a computer. The method comprises a to-be-determined object designation step, a method set creation step, a program execution step, an execution result record step and a pseudo-state creation step. The to-be-determined object designation step is a step of designating a to-be-determined object that is to be determined, and a state of the to-be-determined object. The method set creation step is a step of creating a method set comprising, as elements, methods called from the designated state of the to-be-determined object.

The program execution step is a step of using, as a to-be-determined state, the designated state of the to-be-determined object or another state obtained by calling methods from the designated state, and executing a program for calling methods included in the method set from the to-be-determined state. The execution result record step is a step of recording an execution result in a case of calling the methods. The pseudo-state creation step is a step of creating a pseudo-state by merging a method group that is the elements of the method set, and the execution result in the case of calling each method of the method group, in association with the to-be-determined state of the to-be-determined object.

An invention of claim 7 is obtained by comprehending the invention of claim 1 from a viewpoint of a system. The invention is a system for classifying states of an object in an object-oriented program by using a computer, which is characterized by comprising a to-be-determined object designation section, a method set creation section, a program execution section, an execution result record section and a pseudo-state creation section as structural elements corresponding to the respective steps in the invention of claim 1.

An invention of claim 10 is obtained by comprehending the inventions of claim 1 and claim 7 from a viewpoint of an information recording medium storing a computer program. The invention is an information recording medium storing a program for classifying states of an object in an object-oriented program by using a computer, which is characterized by causing the computer to realize a to-be-determined object designation function, a method set creation function, a program execution function, an execution result record function and a pseudo-state creation function as functions corresponding to the respective steps in the invention of claim 1.

According to these inventions, a concrete state of an object given by the user or another state obtained by calling methods from this concrete state is used as a to-be-determined state. Methods in the method set given by the user are called from the to-be-determined state. Based on the methods that are the elements of the method set and the execution result of the method calling, a pseudo-state of the to-be-determined state is obtained. Accordingly, states can be defined in a pseudo-fashion on the basis of operations of the program under various conditions. Thus, concrete states of the object, which are to be tested and are present prior to calling methods, are restricted according to the obtained pseudo-states, whereby the number of test cases is reduced and the efficiency of tests is enhanced.

An invention of claim 2 is characterized by inclusion of a pseudo-state classification step in the object state classification method of claim 1. The pseudo-state classification step is a step of comparing, when a plurality of the pseudo-states are created in association with a plurality of the to-be-determined states, the plurality of the pseudo-states and classifying the to-be-determined states into groups each having the same pseudo-state.

According to this invention, by the classification and grouping based on the same pseudo-state, the concrete states of the object, which are to be tested and are present prior to calling methods, are classified into groups so that the concrete states in each group belong to the same pseudo-state. Thereby, for example, the concrete states to be tested may be restricted to only representatives of the respective groups. Making use of the grouping according to the pseudo-states, the concrete states can properly be restricted. Therefore, the number of test cases can be reduced, and the efficiency of tests enhanced.

An invention of claim 3 is characterized in that the method set creation step in the object state classification method of claim 1 or claim 2 includes a method set select step. The method set select step is a step of selecting, when a plurality of the method sets are created, a method set to be used.

According to this invention, when a plurality of method sets are created, a method set to be used is selected. The number of times of method calling can be reduced, compared to the case where all methods included in all method sets are called. Therefore, pseudo-states can be created with high efficiency.

An invention of claim 4 is characterized in that in the object state classification method according to any one of claims 1 to 3, the method set creation step includes first and second method set creation steps, the program execution step includes first and second execution steps, and the pseudo-state creation step includes a step of creating a pseudo-state of a to-be-determined state obtained by calling methods. The first method set creation step is a step of creating a method set for a state search, which comprises, as elements, methods called from the designated state of the to-be-determined object. The second method set creation step is a step of creating a method set for state judgment, which comprises, as elements, methods called from a state obtained by calling methods included in the method set for state search.

The first execution step is a step of using, as a pre-execution state, the designated state of the to-be-determined object or another state obtained by calling methods from the designated state, and executing a program for calling methods included in the method set for state search from the pre-execution state. The second execution step is a step of executing a program for calling methods included in the method set for state judgment from a state obtained by calling methods included in the method set for state search. The step of creating a pseudo-state of a to-be-determined state obtained by calling methods is a step of using, as the to-be-determined state, a state obtained by calling methods included in the method set for state search, and creating a pseudo-state by merging a method group that is the elements of the method set for state judgment, and an execution result in a case of calling each method of the method group for state judgment, in association with the to-be-determined state.

An invention of claim 8 is obtained by comprehending the invention of claim 4 from a viewpoint of a system. The invention is characterized in that in the object state classification system according to claim 7, the method set creation section includes first and second method set creation sections corresponding to the first and second method set creation steps in the invention of claim 4, and the program execution section and pseudo-state creation section include functions corresponding to the steps included in the program execution step and pseudo-state creation step in the invention of claim 4.

An invention of claim 11 is obtained by comprehending the inventions of claim 4 and claim 8 from a viewpoint of an information recording medium storing a computer program. The invention is characterized in that in the information recording medium storing a program for object state classification according to claim 10, the method set creation function, the program execution function and the pseudo-state creation function include functions corresponding to the steps included in the method set creation step, the program execution step and the pseudo-state creation step in the invention of claim 4.

According to this invention, a state, which is obtained by calling a method included in the method set for state search from a concrete state given by the user, is used as a to-be-determined state. From the to-be-determined state, a method included in the method set for state judgment is called. Thereby, a pseudo-state is obtained in association with a state obtained by calling the method from the concrete state given by the user.

An invention of claim 5 is characterized in that in the object state classification method according to claim 4, the pseudo-state classification step includes a step of registering a pseudo-state and the program execution step includes a step of repeating the first and second execution steps. The step of registering a pseudo-state is a step registering, when the pseudo-state obtained in association with the to-be-determined state is not registered, the pseudo-state. The step of repeating the first and second execution steps is a step of repeating, when the pseudo-state is newly registered, the first and second execution steps, using as the pre-execution state the to-be-determined state, in association with which the pseudo-state is obtained.

According to this invention, when a pseudo-state obtained in association with the to-be-determined state is a non-registered pseudo-state, this pseudo-state is registered. In addition, when the new pseudo-state is registered, calling of methods is repeated. Thereby, based on the initial state given by the user, pseudo-states, which can be assumed by the object, can comprehensively be detected. Therefore, comprehensive tests can be performed with high efficiency by calling methods, which are test objects, from concrete states that are to-be-determined states from which the pseudo-states have comprehensively been obtained.

An invention of claim 6 is a method of classifying states of a plurality of objects having an inheritance relationship in an object-oriented program by using a computer. This invention includes a pseudo-state detection step and a pseudo-state difference detection step. The pseudo-state detection step is a step of detecting pseudo-states of objects of a parent class and a child class in the plurality of objects, by using the method of claim 4 or claim 5. The pseudo-state difference detection step is a step of comparing the pseudo-states obtained in association with the objects of the parent class and child class, and detecting a difference therebetween.

Further, the pseudo-state detection step includes a parent class pseudo-state detection step and a child class pseudo-state detection step. The parent class pseudo-state detection step is a step of detecting pseudo-states of the object of the parent class, using method sets for the parent class as the method sets for state search and state judgment. The child class pseudo-state detection step is a step of detecting pseudo-states of the object of the child class, using a method set different from the method set for the parent class as the method set for state search, and using the same method set as the method set for the parent class as the method set for state judgment.

An invention of claim 9 is obtained by comprehending the invention of claim 6 from a viewpoint of a system. The invention is a system for classifying states of a plurality of objects having an inheritance relationship in an object-oriented program by using a computer, which is characterized by comprising a pseudo-state detection section and a pseudo-state difference detection section that correspond to the pseudo-state detection step and pseudo-state difference detection step in the invention of claim 6.

An invention of claim 12 is obtained by comprehending the inventions of claims 6 and 9 from a viewpoint of an information recording medium storing a computer program. The invention is characterized by causing the computer to realize a pseudo-state detection function and a pseudo-state difference detection function that correspond to the pseudo-state detection step and pseudo-state difference detection step in the invention of claim 6.

According to these inventions, pseudo-states of the object of the child class are detected using a method set for state search, which is peculiar to the child class, and using a method set for state judgment, which is common with the parent class. The pseudo-states of the object of the child class are compared with pseudo-states obtained in association with the object of the parent class. Thereby, it is easily checked whether the child class creates an unauthorized state in relation to the parent class.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a view for explaining an example of a program list of a concrete object-oriented program, which is to be subjected to the "state classification" operation illustrated in FIG. 2;

FIG. 7 is a view for explaining an example of a process content in the case where a series of procedures are performed from a pre-execution state in the "pseudo-state detection" operation illustrated in FIG. 5;

FIG. 8 is a flow chart schematically illustrating an "intra-class-hierarchy pseudo-state difference detection" operation according to the object state classification system shown in FIG. 1;

FIG. 9 illustrates a patent class and a child class in an inheritance relationship, which are to be subjected to the "intra-class-hierarchy pseudo-state difference detection" shown in FIG. 8, and an example of a detection result of pseudo-states in these classes;

FIG. 10 shows an example of a concrete state;

FIG. 11 shows an example of a state judge method set;

FIG. 12 shows examples of the pseudo-state;

FIG. 13 shows designated concrete states;

FIG. 14 shows state judge methods;

FIG. 15 shows pseudo-states associated with a state 01;

FIG. 16 shows pseudo-states created in association with eight concrete states "state 01" to "state 08";

FIG. 17 illustrates classification of eight concrete states "state 01" to "state 08" into four groups corresponding to the obtained pseudo-states, "pseudo-state A" to "pseudo-state D";

FIG. 18 is a view for explaining a process from setting of an initial state to creation of a state judge method set;

FIG. 19A is a view illustrating an example of a list containing one class, the presence/absence of the definition of the designer's intended state associated with the class, and test cases according to the presence/absence of the definition of the designer's intended state;

FIG. 19B shows test cases in the case where the designer's intended state is not defined in the list shown in FIG. 19A; and FIG. 19C shows test cases in the case where the designer's intended state is defined in the list shown in FIG. 19A.

DETAILED DESCRIPTION OF THE INVENTION

An embodiment of the present invention will now be described in detail with reference to the accompanying drawings. The embodiment to be described adds no limitations to the present invention. A mode of the invention is merely exemplified.

Typically, the present invention is realized by controlling a computer by means of software. The software, in this context, means physical utilization of hardware of the computer, thereby achieving the advantageous effects of the invention. Suitable prior art, if possible, is applied to parts of the invention. Specific kinds and configurations of hardware and software, which realize the present invention, and the range of software processing, can freely be changed. For example, a program that realizes the present invention is a mode of the invention.

[1. Explanations of Terms]

Of the technical terms used in the embodiment to be described below, "concrete state", "state judge method set", "pseudo-state" and "state search method set" are defined as follows.

[1-1. Concrete State]

The term "concrete state" means "a set of designated specific values that can be taken by respective member variables in a class." FIG. 10 shows an example of the concrete state.

[1-2. State Judge Method Set]

The term "state judge method set" means "a set having as an element a pair of a method and an argument." In a case where a global variable is referred to in the method, the value of the global variable is also included. One element does not necessarily include one method, and it may include a series of methods composed of a plurality of methods. FIG. 11 shows an example of the state judge method set. In the example of FIG. 11, only the third element of the state judge method set includes a method series. This method series means "to call lock ( ) method" from a given state, and then "to call isOpened ( ) method."

[1-3. Pseudo-State]

The term "pseudo-state" means "a set having, as elements, a combination comprising each element of a state judge method set and an associated execution result". In an example shown in FIG. 12, a path is used as the execution result.

[1-4. State Search Method Set]

The term "state search method set" basically means a set similar to the "state judge method set". The difference, however, is that a method series is not designated as one element.

[2. System Configuration]

Figure 1:
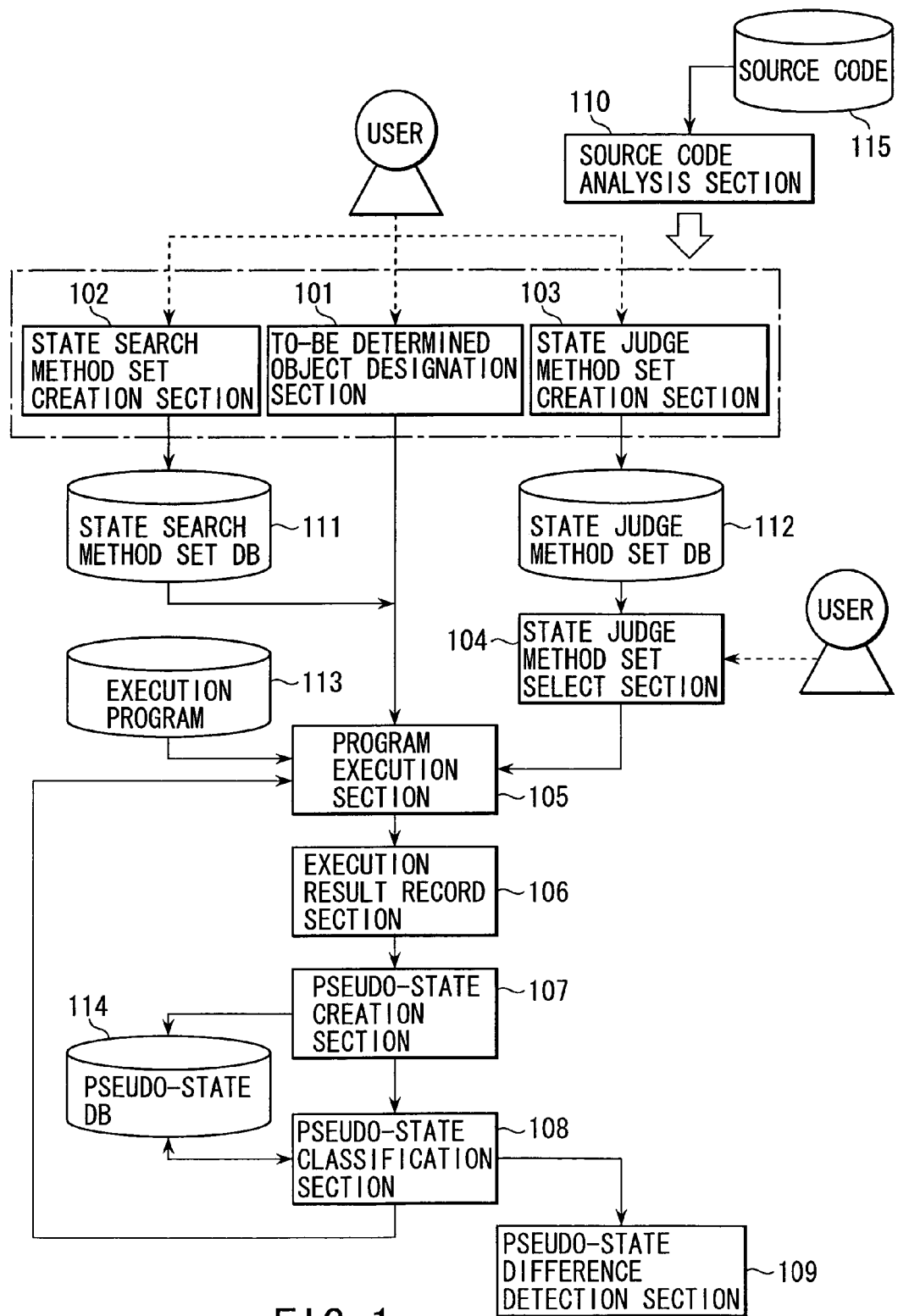
FIG. 1 is a block diagram showing the structure of an object state classification system according to an embodiment, to which the present invention is applied.

FIG. 1 is a block diagram showing the structure of an object state classification system according to an embodiment, to which the present invention is applied. As is shown in FIG. 1, the object state classification system of this embodiment comprises a to-be-determined object designation section 101, a state search method set creation section 102, a state judge method set creation section 103, a state judge method set select section 104, a program execution section 105, an execution result record section 106, a pseudo-state creation section 107, a pseudo-state classification section 108, a pseudo-state difference detection section 109 and a source code analysis section 110. The details of the respective sections are as follows.

The to-be-determined object designation section 101 designates a to-be-determined object in accordance with a user's designation, and designates a to-be-determined state or an initial state of the to-be-determined object.

The state search method set creation section 102 creates, in accordance with a user's designation, a state search method set, which has, as elements, methods called from the designated initial state of the to-be-determined object, and registers the created state search method set in a state search method set database 111. The state search method set creation section 102 corresponds to a first method set creation section in the present invention.

The state judge method set creation section 103 creates, in accordance with a user's designation, a state judge method set, which has, as elements, methods called from a state obtained by calling methods included in the state search method set registered in the state search method set database 111, and registers the created state judge method set in a state judge method set database 112. The state judge method set creation section 103 corresponds to a second method set creation section in the present invention.

The state judge method set select section 104 selects a state judge method set to be used, when a plurality of state judge method sets are created by the state judge method set creation section 103 and registered in the state judge method set database 112.

The program execution section 105 executes an execution program 113 that calls methods from a certain state of an object. In particular, the program execution section 105 calls methods included in a method set from a to-be-determined state, which is a state designated by the to-be-determined object designation section 101 or another state obtained by calling methods from this state. Specifically, the program execution section 105 executes the execution program 113, and in a "state classification" operation to be described later, the program execution section 105 calls methods included in the to-be-determined method set from the to-be-determined state designated by the to-be-determined object designation section 101.

In addition, in a "pseudo-state detection" operation to be described later, the program execution section 105 calls methods included in a state search method set from the designated initial state, and then calls methods included in a state judge method set. Specifically, in the "pseudo-state detection" operation, the program execution section 105 calls methods included in the state search method set from a pre-execution state, which is a designated initial state or another state obtained by calling methods from this initial state. Subsequently, the program execution section 105 calls methods included in the state judge method set from the state obtained by the calling of the methods from the state search method set.

The execution result record section 106 records an execution result in the case where methods included in the state search method set or state judge method set have been called.

The pseudo-state creation section 107 creates a pseudo-state in association with the to-be-determined state of the to-be-determined object, by merging a method group that is elements of the to-be-determined method set and the execution result obtained when the respective methods of the method group are called.

The pseudo-state classification section 108 compares pseudo-states obtained in association with the to-be-determined states of the to-be-determined object, and classifies the to-be-determined states into groups each belong to the same pseudo-state. In a "state classification" operation to be described later, the pseudo-state classification section 108 classifies a plurality of to-be-determined states into groups such that the to-be-determined states in the same group belong to the same pseudo-state. In addition, in the "pseudo-state detection" operation to be described later, the pseudo-state classification section 108 compares an obtained pseudo-state with the already registered pseudo-states, and if the obtained pseudo-state is a non-registered one, the pseudo-state classification section 108 registers it in a pseudo-state database 114 as a newly detected pseudo-state.

When states of a plurality of objects that have an inheritance relationship are classified, the pseudo-state difference detection section 109 compares pseudo-states that are obtained in association with an object of a parent class and an object of a child class through the series of operations of the sections from the to-be-determined object designation section 101 to the pseudo-state classification section 108, thereby detecting a difference between the pseudo-states.

The source code analysis section 110 analyzes a source code of a to-be-classified object-oriented program that is stored in a source code database 115, and provides necessary data to the to-be-determined object designation section 101, state search method set creation section 102 and state judge method set creation section 103.

[3. Operations]

Specific operations of the object state classification system according to the present embodiment with the above-described structure will now be described.

[3-1. State Classification]

Figure 2:
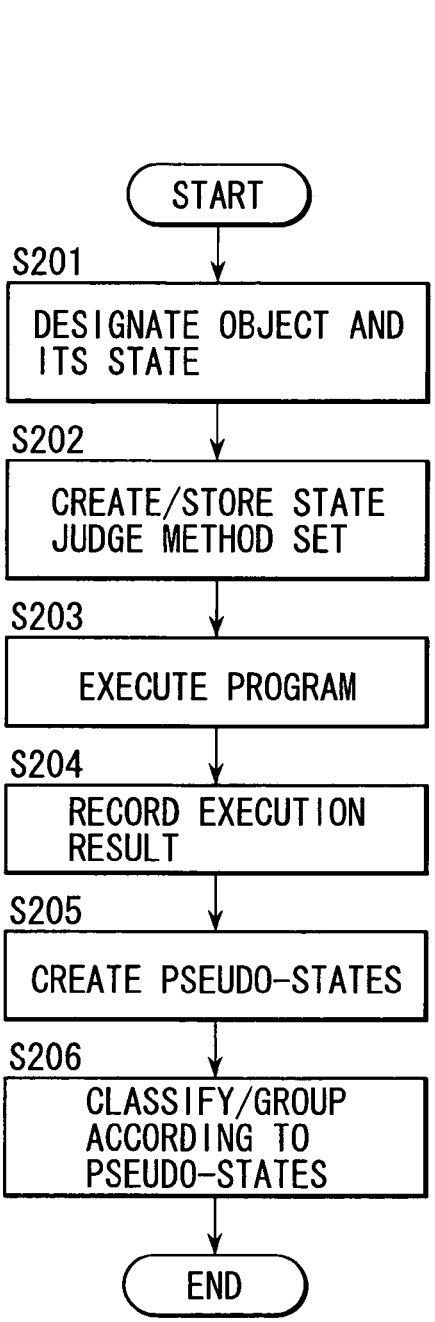
FIG. 2 is a flow chart schematically illustrating a "state classification" operation as a basic operation of the object state classification system shown in FIG. 1.

FIG. 2 is a flow chart schematically illustrating a "state classification" operation as a basic operation of the object state classification system shown in FIG. 1. In the state classification operation, pseudo-states associated with concrete states of an object designated by the user are acquired. In accordance with the obtained pseudo-states, the concrete states are classified. FIG. 3 is a view for explaining an example of a program list of a concrete object-oriented program, which is to be subjected to the "state classification" operation illustrated in FIG. 2.

Referring to FIG. 2 and FIG. 3, the classification of states ("state classification") according to the object state classification system of this embodiment is specifically described. In the description of this specification, "designation" by the user means "user's designating operation through an input/output device generally attached or connected to a computer." Besides, "designation" by the to-be-determined object designation section 101, etc., means "designation of data by computer."

As is shown in FIG. 2, in the state classification, the to-be-determined object designation section 101 designates, upon a user's designation, a to-be-determined object, and also designates a to-be-determined state of the to-be-determined object (S201). That is, the to-be-determined object designation section 101 designates which instance in which class should be used as a to-be-determined object, and which concrete state of the instance should be used as a to-be-determined state. For example, assume that eight concrete states, "state 01" to "state 08", shown in FIG. 13 are designated as concrete states of an instance in class "Door" shown in FIG. 3. It is also conceivable that a concrete state of a parent class is designated in relation to an instance of a child class.

Next, upon the user's designation, the state judge method set creation section 103 creates a state judge method set, which has, as elements, methods necessary for determining and classifying pseudo-states, and registers the created state judge method set in the state judge method set database 112 (S202). The creation of the state judge method set includes setting of a method set, setting of an argument to be referred to, and setting of a global variable. It is also possible to prepare a plurality of state judge method sets in advance, and to select a to-be-used one from the state judge method sets when the program is executed.

For example, assume that all methods defined in class "Door" in FIG. 3 are used as state judge methods, as shown in FIG. 14, and three arguments "−10", "45" and "100" are given to the "setAngle" methods.

In a case where a plurality of state judge method sets are registered in the state judge method set database 112, the state judge method set select section 104 selects, upon the user's designation, a state judge method set that is to be used in order to determine pseudo-states. In addition, in a case where there is only one state judge method set, this state judge method set is automatically selected.

Subsequently, the program execution section 105 calls all methods included in the selected state judge method set, with respect to each of the designated concrete states of the to-be-determined object (S203). It should be noted that the object, which is present prior to the calling of state judge methods, must have a designated concrete state. The reason is that when the methods included in the state judge method set are successively called, a given method may possibly change the state of the object. Thus, unless it is ensured that the state judge method does not change the state of the object, the object needs to be set in the designated concrete state before the state judge methods are called.

Next, the execution result record section 106 records an execution result of the program by the program execution section 105 (S204). In this case, "execution result" is, for instance, "return value of method", "execution path", etc. In the present embodiment, it is assumed that an execution path within the called method is used as the execution result. The "execution path", in this context, means a record as regards an execution result at a branch, for example, as regards whether a branch sentence is "true" or "false". In the program shown in FIG. 3, "block 11", etc., are described in comments. A series of block numbers corresponds to the execution path.

Then, the pseudo-state creation section 107 creates a pseudo-state by adding the state judge method set used in the execution of the program and the execution result, with respect to each of the concrete states that are the to-be-determined states, and the pseudo-state creation section 107 registers the created pseudo-states in the pseudo-state database 114 (S205). FIG. 15 shows pseudo-states created in the case where the program has been executed using the state judge method set shown in FIG. 14 with respect to the concrete state "state 01" shown in FIG. 13. In the present embodiment, the block number described in the program shown in FIG. 3 is used as the execution path. In this embodiment, the execution path corresponds to a single block number. However, in general, the execution path is a series of block numbers.

With respect to the other concrete states "state 02" to "state 08" shown in FIG. 13, pseudo-states are similarly created. FIG. 16 shows pseudo-states created with respect to eight concrete states "state 01" to "state 08".

As has been described above, the pseudo-state is defined with respect to each of the concrete states of the to-be-determined object. In this case, it is possible that the same pseudo-state is defined for different concrete states that are the to-be-determined states. In the present embodiment, the pseudo-state classification section 108 compares a plurality of obtained pseudo-states and classifies the concrete states, from which the pseudo-states are obtained, into groups such that a plurality of concrete states included in the same group belong to the same pseudo-state (S206).

In an example shown in FIG. 16, each of eight concrete states, "state 01" to "state 08", is associated with one selected from the four pseudo-states, "pseudo-state A" to "pseudo-state D". Thus, as shown in FIG. 17, the eight concrete states, "state 01" to "state 08", can be classified into four groups corresponding to the four pseudo-states, "pseudo-state A" to "pseudo-state D".

[3-2. Advantageous Effect of State Classification]

In the above-described "state classification" according to the object state classification system of the present embodiment, concrete states of an object, which are given by the user, are used as to-be-determined states, and the respective methods of the state judge method set given by the user are called from the to-be-determined states. Thereby, pseudo-states of the to-be-determined states can be obtained on the basis of the methods that are the elements of the state judge method set, and the execution result of the method calling.

Accordingly, states can be defined in a pseudo-fashion on the basis of the operations of the program under various conditions. Thus, the concrete states of the object, which are to be tested and are present prior to calling methods, are restricted in range in accordance with the obtained pseudo-states. Thereby, the number of tests can be decreased, and the efficiency of tests enhanced.

In particular, the concrete states are classified into groups so that the concrete states in the same group belong to the same pseudo-state. Thereby, the concrete states of the object, which are to be tested and are present prior to calling methods, are restricted to only representatives of the respective groups. Making use of the grouping according to the pseudo-states, the concrete states can properly be restricted in range. Therefore, the number of test cases can be reduced, and the efficiency of tests enhanced. This point is explained in greater detail.

Figure 4:
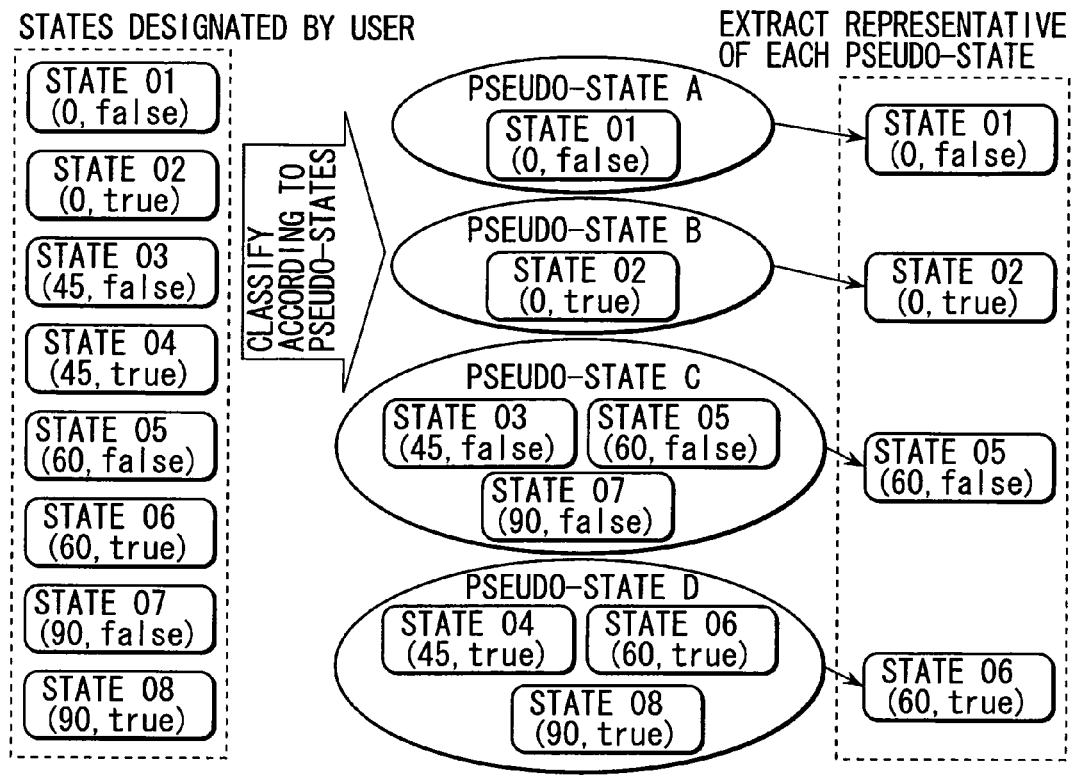
FIG. 4 is a view for explaining an example of a practical scheme using the "state classification" illustrated in FIG. 2.

In a possible practical technique using the "state classification", concrete states may be classified according to pseudo-states, when tests are to be conducted by calling methods from various concrete states of the object. In the example shown in FIG. 3 and FIGS. 13 to 17, four representatives, which respectively represent four pseudo-states, "pseudo-state A" to "pseudo-state D", are chosen as shown in FIG. 4. Only the chosen representatives may be tested. In this case, only the four concrete states, "state 01", "state 02", "state 05" and "state 06", which represent the respective pseudo-states, are tested. If this "state classification" technique was not applied, eight concrete states, "state 01" to "state 08", would need to be tested. Therefore, the number of test cases can be halved and the efficiency of tests can be increased.

In the above-described "state classification", in a case where a plurality of state judge method sets are created, the state judge method set select section 104 selects a state judge method set to be used. Thus, the calling of methods is restricted, compared to the case where all methods in all state judge method sets are called. Therefore, pseudo-states can efficiently be created.

[3-3. Detection of Pseudo-State]

Figure 5:
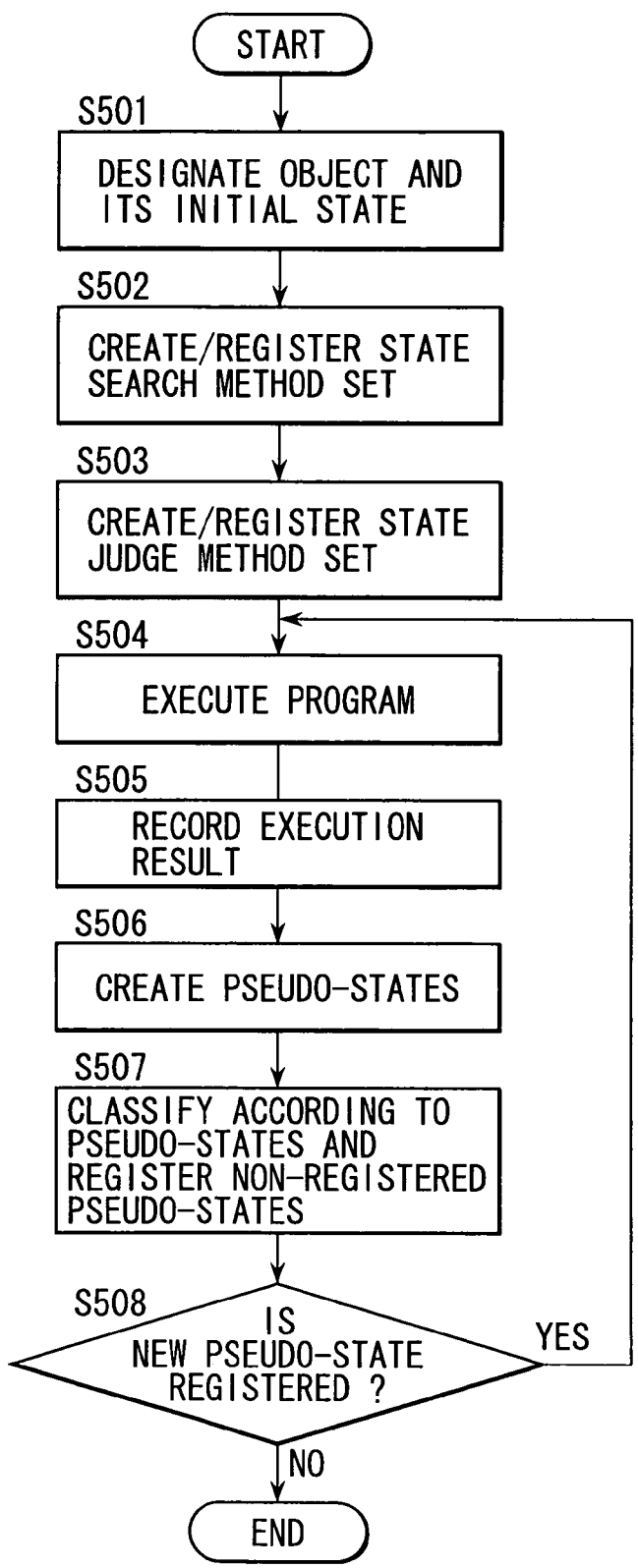
FIG. 5 is a flow chart schematically illustrating a "pseudo-state detection" operation according to the object state classification system shown in FIG. 1.

FIG. 5 is a flow chart schematically illustrating another operation of the object state classification system according to the present embodiment. In this operation, pseudo-states, which are associated with concrete states obtained by calling methods from an initial state of the object designated by the user, are detected. In the detection of pseudo-states, state search methods are called from the initial state. With respect to concrete states that are thereby obtained, pseudo-states are detected by calling state judge methods. If a detected pseudo-state is a non-registered pseudo-state, state search methods associated with the non-registered pseudo-state are further called. With respect to concrete states that are thereby obtained, pseudo-states are detected by calling state judge methods. This procedure is repeated. Referring to FIG. 5, the detection of pseudo-states by the object state classification system of the present embodiment will be described in detail.

To start with, in the pseudo-state detection as shown in FIG. 5, the to-be-determined object designation section 101 designates, upon designation by the user, a to-be-determined object and an initial state thereof (S501). Specifically, designation of a specific constructor may be substituted.

Then, upon designation by the user, the state search method set creation section 102 creates a state search method set, which has, as elements, methods called from the designated initial state of the to-be-determined object, and registers the created state search method set in the state search method set database 111 (S502). The creation of the state search method set includes setting of a method set, setting of an argument to be referred to, and setting of a global variable.

The technical significance of "adding a certain method in the state search method set" is "to determine a state, which is obtainable after this method is called, to be a pseudo-state." It is desirable, therefore, to limit methods, which are to be included in the state search method set, to the methods that may possibly change the state of the object.

Subsequently, upon designation by the user, the state judge method set creation section 103 creates a state judge method set including, as elements, methods that are necessary for determining and classifying pseudo-states, and registers the created state judge method set in the state judge method set database 112 (S503). The creation and registration of the state judge method set are the same as the above-described creation and registration of the state judge method set in the "state classification" operation.

Next, assuming that the designated initial state or the state obtained after calling the methods is a pre-execution state, the program execution section 105 calls, in association with the pre-execution state, all combinations between all methods of the state search method set and all methods of the state judge method set. Specifically, one method included in the state search method set is called from the pre-execution state. Then, taking the state obtained by the method calling as a to-be-determined state, one method included in the state judge method set is called from this to-be-determined state (S504).

Figure 6:
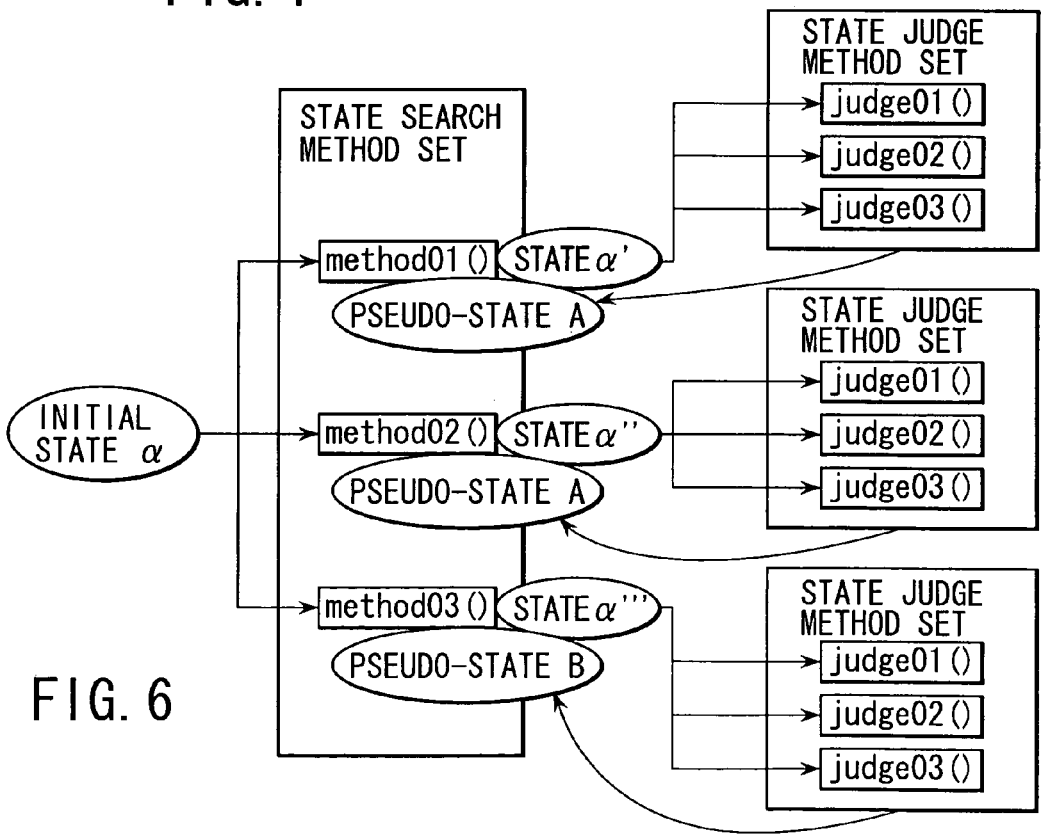
FIG. 6 is a view for explaining an example of a program execution procedure in the "pseudo-state detection" operation illustrated in FIG. 5.

FIG. 6 is a view illustrating an example of this program execution procedure. In the example shown in FIG. 6, "initial state α" is designated as the initial state. A state search method set comprising as elements three methods, "method 01( )", "method 02( )" and "method 03( )", is created. A state judge method set comprising as elements three methods, "judge 01( )", "judge 02( )" and "judge 03( )", is created.

In the example shown in FIG. 6, the state obtained after calling method "method 01( )" included in the state search method set from the "initial state α" is defined as "state α'". The three methods, "judge 01( )", "judge 02( )" and "judge 03( )", included in the state judge method set are called from the state "state α'". Similarly, the state obtained after calling method "method 02( )" from the "initial state α" is defined as "state α''", and the state obtained after calling method "method 03( )" from the "initial state α" is defined as "state α'''". In this example, as shown in FIG. 18 below, nine execution patterns in total are present. In FIG. 18, symbol "→" means that methods are successively called. FIG. 18 is a view for explaining the process from the setting of the initial state to the creation of the state judge method set.

Next, the execution result record section 106 records execution results of the program by the program execution section 105 (S505). The recording of the execution results is the same as the above-described recording of execution results in the "state classification" operation.

Subsequently, the pseudo-state creation section 107 creates a pseudo-state in association with each concrete state that is the to-be-determined state, by adding the state judge method set used in execution of the program and the execution result (S506). The creation and registration of pseudo-states are the same as those described in connection with the "state classification" operation.

The pseudo-state classification section 108 compares the obtained pseudo-states, and classifies the concrete states into groups such that the concrete states included in the same group belong to the same pseudo-state. The pseudo-states of the respective groups are compared with already registered pseudo-states. If there is a pseudo-state that is not included in the registered pseudo-states, that is, if the obtained pseudo-state has not been registered, this pseudo-state is registered in the pseudo-state database as a newly detected pseudo-state (S507).

If there is a newly registered pseudo-state (YES in S508), the newly registered pseudo-state is taken as a pre-execution state. In connection with the pre-execution state, a series of procedures (S504–S507) are repeated: method calling by the program execution section 105, recording of execution results by the execution result record section 106, creation of pseudo-states by the pseudo-state creation section 107, and classification/registration of pseudo-states by the pseudo-state classification section 108.

FIG. 7 is a view illustrating an example of the process content in the series of procedures (S504–S507). In this example, "constructor" is designated as the initial state, and a pseudo-state obtained from the "constructor" is defined as "pseudo-state A." In this case, the series of procedures (S504–S507) are repeated five times.

In a first process, states obtained by calling "method 01( )", "method 02( )" and "method 03( )" from the initial state are used as to-be-determined states. In connection with these to-be-determined states, a non-registered "pseudo-state B", other than the registered "pseudo-state A", is obtained. Thus, the "pseudo-state B" is registered. A second process is performed from the concrete state, from which the "pseudo-state B" is obtained.

In the second process, non-registered "pseudo-state C" and "pseudo-state D" are obtained. Thus, the "pseudo-state C" is registered, and a third process is performed from the concrete state, from which the "pseudo-state C" is obtained. In addition, the "pseudo-state D" is registered, and a fourth process is performed from the concrete state, from which the "pseudo-state D" is obtained. In the third process, there is no non-registered pseudo-state. However, in the fourth process, a non-registered "pseudo-state E" is obtained. Thus, the "pseudo-state E" is registered and a fifth process is performed from the concrete state, from which the "pseudo-state E" is obtained. Since there is no non-registered pseudo-state in the fifth process, the repeated process is finished.

As has been described above, as long as a new pseudo-state is registered (NO in S508), the series of procedures (S504–S507) are repeated to continue detection of a pseudo-state. The "pseudo-state detection" is finished at the time a new pseudo-state is no longer registered (NO in S508).

[3-4. Advantageous Effect Obtained by Pseudo-State Detection]

According to the "pseudo-state detection" in the object state classification system of the present embodiment, the states, which are obtained by calling methods included in the state search method set from the concrete state given by the user, are used as to-be-determined states. From the to-be-determined states, methods included in the state judge method set are called. Thereby, pseudo-states, which are associated with the states obtained by calling methods from the concrete state given by the user, can be obtained.

In particular, when a pseudo-state obtained in association with the to-be-determined state is a non-registered pseudo-state, this pseudo-state is registered. In addition, when the new pseudo-state is registered, calling of methods is repeated. Thereby, based on the initial state given by the user, pseudo-states, which can be assumed by the object, can comprehensively be detected. Therefore, comprehensive tests can be performed with high efficiency by calling to-be-tested methods from concrete states that are to-be-determined states, from which the pseudo-states have comprehensively been obtained.

[3-5. Intra-Class-Hierarchy Pseudo-State Difference Detection]

FIG. 8 is a flow chart schematically illustrating another operation of the object state classification system of the present embodiment. In this operation, a difference between pseudo-states in a class hierarchy is detected using the above-described "pseudo-state detection". FIG. 9 is a view for explaining a parent class and a child class having an inheritance relationship, which are to be subjected to the "intra-class-hierarchy pseudo-state difference detection" illustrated in FIG. 8, and an example of a detection result of pseudo-states in each of these classes. Referring now to FIGS. 8 and 9, the "intra-class-hierarchy pseudo-state difference detection" according to the object state classification system of the present embodiment is described in detail.

To start with, "pseudo-state detection" as illustrated in FIG. 5 is conducted on a to-be-determined object in a parent class, using a state search method set for the parent class and a state judge method set. Thus, pseudo-states that can be taken by the object of the parent class are detected (S801). In the example shown in FIG. 9, an instance "Parent" is designated as the to-be-determined object of the parent class, and "p1=0, p2=0" is designated as the initial state of the object. From the initial state, pseudo-states that can be taken by the object of the parent class are detected, using methods, "PMethod01( )", "PMethod02( )" and "PMethod03( )" for the parent class, as the state search method set and state judge method set for the parent class. In the example of FIG. 9, two pseudo-states, "pseudo-state A" and "pseudo-state B", are detected as pseudo-states that can be taken by the object of the parent class.

Subsequently, "pseudo-state detection" as illustrated in FIG. 5 is conducted on a to-be-determined object in a child class, using a state search method set for a child class and the state judge method set for the parent class. Thus, "parent class" pseudo-states that can be taken by the object of the child class are detected (S802). In the example shown in FIG. 9, an instance "Child" is designated as the to-be-determined object of the child class, and "p1=0, p2=0" is designated as the initial state of the object. From the initial state, pseudo-states that can be taken by the object of the child class are detected, using methods, "CMethod01( )" and "CMethod02( )" for the child class as a state search method set for the child class and the state judge method set that is the same as the state judge method for the parent class. In the example of FIG. 9, three pseudo-states, "pseudo-state A", "pseudo-state B" and "pseudo-state C", are detected as pseudo-states that can be taken by the object of the child class.

The pseudo-states obtained for the parent class and the pseudo-states obtained for the child class are compared, and a difference therebetween is detected (S803). In other words, it is detected whether the pseudo-states detected for the object of the child class includes a pseudo-state that is not detected for the object of the parent class. In the example of FIG. 9, "pseudo-state C" that is not detected for the object of the parent class is present in the pseudo-states detected for the object of the child class. Thus, the "pseudo-state C" is detected as the difference.

[3-6. Advantageous Effect Obtained by Intra-Class-Hierarchy Pseudo-State Difference Detection]

According to the above-described "intra-class-hierarchy pseudo-state difference detection" by the object state classification system of the present embodiment, the state search method set for the child class and the state judge method set common with the parent class are used in association with the object of the child class. Thus, the pseudo-states for the child class are detected and compared with the pseudo-states obtained for the object of the parent class. Thereby, it is easily checked whether the child class creates a pseudo-state that is not found in association with the parent class.

If the pseudo-states detected for the object of the child class includes a pseudo-state that is not detected in association with the object of the parent class, it is determined that the child class has possibly created an unauthorized state for the parent class or a non-checked state. Hence, it becomes possible to call the user's attention by issuing some alert.

[4. Other Embodiments]

The present invention is not limited to the above-described embodiment, and other various embodiments and modifications can be made without departing from the spirit of the invention.

For instance, the system configuration shown in FIG. 1 and the process procedures illustrated in FIGS. 2, 5 and 8 are mere examples, and specific system configurations and process procedures can freely be altered. In addition, the program list shown in FIG. 3 is only an example. The present invention is applicable to a variety of object-oriented programs, and the excellent advantages can similarly be obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of classifying states of an object in an object-oriented program by using a computer, comprising:
    designating a to-be-determined object that is to be determined, and a state of the to-be-determined object;
    creating a method set comprising, as elements, methods called from the designated state of the to-be-determined object;
    using, as a to-be-determined state, the designated state of the to-be-determined object or another state obtained by calling methods from the designated state, and executing a program for calling methods included in the method set from the to-be-determined state;
    recording an execution result in a case of calling the methods; and
    creating a pseudo-state by merging a method group that is the elements of the method set, and the execution result in the case of calling each method of the method group, in association with the to-be-determined state of the to-be-determined object.

2. The object state classification method according to claim 1, further comprising:
    comparing, when a plurality of the pseudo-states are created in association with a plurality of the to-be-determined states, the plurality of the pseudo-states and classifying the to-be-determined states into groups each having the same pseudo-state.

3. The object state classification method according to claim 1, wherein the step of creating the method set includes a method set select step of selecting, when a plurality of the method sets are created, a method set to be used.

4. The object state classification method according to claim 1, wherein the step of creating the method set includes:
    a first method set creation step of creating a method set for a state search, which comprises, as elements, methods called from the designated state of the to-be-determined object; and
    a second method set creation step of creating a method set for state judgment, which comprises, as elements, methods called from a state obtained by calling methods included in the method set for state search,
    the step of executing includes:
    a first execution step of using, as a pre-execution state, the designated state of the to-be-determined object or another state obtained by calling methods from the designated state, and executing a program for calling methods included in the method set for state search from the pre-execution state; and
    a second execution step of executing a program for calling methods included in the method set for state judgment from a state obtained by calling methods included in the method set for state search, and
    the step of creating the pseudo-state includes:
    a step of using, as the to-be-determined state, a state obtained by calling methods included in the method set for state search, and creating a pseudo-state by merging a method group that is the elements of the method set for state judgment, and an execution result in a case of calling each method of the method group for state judgment, in association with the to-be-determined state.

5. The object state classification method according to claim 4, wherein the step of classifying includes a step of registering, when the pseudo-state obtained in association with the to-be-determined state is not registered, the pseudo-state, and
    the step of executing includes a step of repeating, when the pseudo-state is newly registered, the first and second execution steps, using as the pre-execution state the to-be-determined state, in association with which the pseudo-state is obtained.

6. A method of classifying states of a plurality of objects having an inheritance relationship in an object-oriented program by using a computer, comprising:
    detecting pseudo-states of objects of a parent class and a child class in the plurality of objects, by using the method of claim 4; and
    comparing the pseudo-states obtained in association with the objects of the parent class and child class, and detecting a difference therebetween, and
    the step of detecting the pseudo-states including:
    a parent class pseudo-state detection step of detecting pseudo-states of the object of the parent class, using method sets for the parent class as the method sets for state search and state judgment; and a child class pseudo-state detection step of detecting pseudo-states of the object of the child class, using a method set different from the method set for the parent class as the method set for state search, and using the same method set as the method set for the parent class as the method set for state judgment.

7. A system for classifying states of an object in an object-oriented program by using a computer, comprising:

a to-be-determined object designation section that designates a to-be-determined object that is to be determined, and a state of the to-be-determined object;

a method set creation section that creates a method set comprising, as elements, methods called from the designated state of the to-be-determined object;

a program execution section that uses, as a to-be-determined state, the designated state of the to-be-determined object or another state obtained by calling methods from the designated state, and executes a program for calling methods included in the method set from the to-be-determined state;

an execution result record section that records an execution result in a case of calling the methods; and a pseudo-state creation section that creates a pseudo-state by merging a method group that is the elements of the method set, and the execution result in the case of calling each method of the method group, in association with the to-be-determined state of the to-be-determined object.

8. The object state classification system according to claim 7, wherein the method set creation section includes:

a first method set creation section that creates a method set for a state search, which comprises, as elements, methods called from the designated state of the to-be-determined object; and a second method set creation section that creates a method set for state judgment, which comprises, as elements, methods called from a state obtained by calling methods included in the method set for state search, the program execution section uses, as a pre-execution state, the designated state of the to-be-determined object or another state obtained by calling methods from the designated state, executes a program for calling methods included in the method set for state search from the pre-execution state, and then executes a program for calling methods included in the method set for state judgment from a state obtained by calling the methods included in the method set for state search; and the pseudo-state creation section uses, as the to-be-determined state, a state obtained by calling methods included in the method set for state search, and creates a pseudo-state by merging a method group that is the elements of the method set for state judgment, and an execution result in a case of calling each method of the method group for state judgment, in association with the to-be-determined state.

9. A system for classifying states of a plurality of objects having an inheritance relationship in an object-oriented program by using a computer, comprising:

a pseudo-state detection section that detects pseudo-states of objects of a parent class and a child class in the plurality of objects, by using the system of claim 8; and a pseudo-state difference detection section that compares the pseudo-states obtained in association with the objects of the parent class and child class, and detects a difference therebetween, the pseudo-state detection section detecting pseudo-states of the object of the parent class, using method sets for the parent class as the method sets for state search and state judgment, and detecting pseudo-states of the object of the child class, using a method set different from the method set for the parent class as the method set for state search, and using the same method set as the method set for the parent class as the method set for state judgment.

10. An information recording medium storing a program for classifying states of an object in an object-oriented program by using a computer, the program comprising:

a to-be-determined object designation function that designates a to-be-determined object that is to be determined, and a state of the to-be-determined object;

a method set creation function that creates a method set comprising, as elements, methods called from the designated state of the to-be-determined object;

a program execution function that uses, as a to-be-determined state, the designated state of the to-be-determined object or another state obtained by calling methods from the designated state, and executes a program for calling methods included in the method set from the to-be-determined state;

an execution result record function that records an execution result in a case of calling the methods; and a pseudo-state creation function that creates a pseudo-state by merging a method group that is the elements of the method set, and the execution result in the case of calling each method of the method group, in association with the to-be-determined state of the to-be-determined object.

11. The information recording medium according to claim 10, wherein the method set creation function includes:

a first method set creation function that creates a method set for a state search, which comprises, as elements, methods called from the designated state of the to-be-determined object; and a second method set creation function that creates a method set for state judgment, which comprises, as elements, methods called from a state obtained by calling methods included in the method set for state search, the program execution function includes:

a first execution function that uses, as a pre-execution state, the designated state of the to-be-determined object or another state obtained by calling methods from the designated state, and executes a program for calling methods included in the method set for state search from the pre-execution state; and a second execution function that executes a program for calling methods included in the method set for state judgment from a state obtained by calling the methods included in the method set for state search, and the pseudo-state creation function uses, as the to-be-determined state, a state obtained by calling methods included in the method set for state search, and creates a pseudo-state by merging a method group that is the elements of the method set for state judgment, and an execution result in a case of calling each method of the method group for state judgment, in association with the to-be-determined state.

12. An information recording medium storing a program for classifying states of a plurality of objects having an inheritance relationship in an object-oriented program by using a computer, the program comprising:
- a pseudo-state detection function that causes the computer to detect pseudo-states of objects of a parent class and a child class in the plurality of objects, by using the program of claim 11; and
- a pseudo-state difference detection function that causes the computer to compare the pseudo-states obtained in association with the objects of the parent class and child class, and to detect a difference therebetween, the pseudo-state detection function including:
- a parent class pseudo-state detection function that detects pseudo-states of the object of the parent class, using method sets for the parent class as the method sets for state search and state judgment; and
- a child class pseudo-state detection function that detects pseudo-states of the object of the child class, using a method set different from the method set for the parent class as the method set for state search, and using the same method set as the method set for the parent class as the method set for state judgment.

* * * * *